United States Patent [19]

Müller et al.

[11] Patent Number: 5,382,348

[45] Date of Patent: * Jan. 17, 1995

[54] GRANULAR BITUMEN COATED WITH PRECIPITATED SILICA

[75] Inventors: Karl-Hans Müller, Bruchköbel; Walter Barthel, Langenselbold, both of Germany

[73] Assignee: Degussa AG, Germany

[*] Notice: The portion of the term of this patent subsequent to Oct. 1, 2008 has been disclaimed.

[21] Appl. No.: 98,696

[22] Filed: Jul. 13, 1993

Related U.S. Application Data

[63] Continuation of Ser. No. 858,430, Mar. 24, 1992, abandoned, which is a continuation of Ser. No. 622,535, Dec. 5, 1990, abandoned.

[30] Foreign Application Priority Data

Dec. 21, 1989 [DE] Germany .............................. 3942215

[51] Int. Cl.$^6$ ...................... B32B 11/04; B32B 11/12; C08L 95/00
[52] U.S. Cl. ...................... 208/22; 208/39; 106/281.1
[58] Field of Search ................ 208/39, 22; 106/281.1

[56] References Cited

U.S. PATENT DOCUMENTS

| | | | |
|---|---|---|---|
| 1,979,251 | 3/1933 | Chapline et al. | 94/42 |
| 2,400,563 | 10/1942 | Mark | 106/281.1 |
| 2,459,520 | 8/1944 | Greenshields | 106/281 R |
| 3,235,482 | 2/1966 | Knowles et al. | 208/39 |
| 3,235,483 | 2/1966 | McCoy et al. | 208/39 |
| 5,053,279 | 10/1991 | Daniels et al. | 106/281.1 |

Primary Examiner—Helane Myers
Assistant Examiner—Walter D. Griffin
Attorney, Agent, or Firm—Cushman, Darby & Cushman

[57] ABSTRACT

Bitumen granulate containing from 0.5 to 15% by weight, preferably from 6.1 to 15% by weight, of a powdering and separating agent such as, for example, synthetic silica or carbon black is produced by atomizing hot, liquid bitumen in a spray mixer and at the same time introducing the powdering and separating agent into the spray mixer by way of the stream of cold air.

1 Claim, 2 Drawing Sheets

GRANULAR BITUMEN COATED WITH PRECIPITATED SILICA

This is a continuation of application Ser. No. 07/858,430, filed on Mar. 24, 1992, which was a continuation an FWC rule 62 of Ser. No. 07/622,535 filed Dec. 5, 1990; which were all abandoned upon the filing hereof.

The present invention relates to a bitumen granulate and to the process for its preparation.

BACKGROUND OF THE INVENTION

Bitumen is a petroleum product obtained by the refining of petroleum. Consisting of a high molecular weight mixture of hydrocarbons, bitumen is a dark colored sticky mass with a consistency ranging from springy hard to viscous and with water-repellent properties (see DIN 55 946).

Bitumen is readily worked up at high temperatures owing to its thermoplastic properties.

For most applications, e.g. for the preparation of asphalt mixtures for road construction or bituminous roof coverings, bitumen must be supplied from the refinery in a hot liquid state and kept ready for use in insulated storage tanks.

It is known to prepare a pulverulent bitumen concentrate containing from 10 to 80% by weight of synthetic silica by spraying the liquid bitumen on to silica (German Patent DE-PS 29 33 339) so that the silica is completely covered by bitumen.

The known bitumen concentrate has the disadvantage that, owing to the static pressure, it sticks together during storage and thereby loses its capacity to flow freely. The problem therefore arises of preparing a bitumen granulate which can be stored over a considerable length of time without losing its free flowing property.

SUMMARY OF THE INVENTION

The present invention provides to a free-flowing bitumen granulate containing from 0.5 to 15% by weight, preferably from 6.1 to 15% by weight, of a powdering and separating agent such as, for example, synthetic silica or carbon black.

In a preferred embodiment of the invention, the proportion of powdering and separating agent may be from 1.8 to 12% by weight, in particular 10% by weight.

The bulk density of the bitumen granulate according to the invention may be from 400 to 800 g/1 (determined according to DIN 53912).

The particle size of the bitumen granulate according to the invention may be from 500 to 700 μm.

Any known types of bitumen may be used. Those which are solid at room temperature are particularly suitable.

Softer types of road bitumen such as B 200, for example, are hardly suitable.

The powdering and separating agents used for the bitumen granulate according to the invention may be synthetic silicas obtained pyrogenically or by precipitation, or carbon blacks.

The synthetic silica used for the bitumen granulate according to the invention may be the silicas described in Winnacker-Küchler, Chemische Technologie II, 4th Edition, Carl Hauser Verlag Munich, Vienna 1983, pages 75 to 90.

Pyrogenic silicas prepared by flame hydrolysis as well as precipitated or precipitation silicas are of particular importance. The precipitated silicas are preferred for the present invention.

The precipitated silicas may be used without having been milled or after milling or spray drying or after spray drying and milling.

The average particle size of the agglomerates (secondary particle size) may be from 4 to 100 μm, preferably from 6 to 10 μm (Coulter Counter).

TABLE I

| | | FK 320 DS | Duro-sil | Siper-nat 22 | Siper-nat 22 S | Siper-nat 22 LS |
|---|---|---|---|---|---|---|
| Surface according to BET 1) | m$^2$/g | 170 | 60 | 190 | 190 | 190 |
| Average size of the primary particles | nm | 18 | 40 | 18 | 18 | 4.5 |
| Packing density 2) | g/1 | 80 | 210 | 270 | 120 | 80 |
| pH 3) | | 6.3 | 9 | 6.3 | 6.3 | 6.3 |
| Sieve residue 4) according to Mocker 45 m | % | 0.01 | 0.3 | 0.5 | 0.1 | 0.1 |
| Loss on drying 5) (2 h at 105° C.) | % | 6 | 6 | 6 | 6 | 6 |
| Loss on annealing 5) 6) (2 h at 1000° C.) | % | 5 | 6 | 5 | 5 | 5 |
| SiO$_2$ 7) | % | 98 | 98 | 98 | 98 | 98 |
| Na$_2$O 7) | % | 1 | 1 | 1 | 1 | 1 |
| Fe$_2$O$_3$ 7) | % | 0.03 | 0.03 | 0.03 | 0.03 | 0.03 |
| SO$_3$ 7) | % | 0.8 | 0.8 | 0.8 | 0.8 | 0.8 |

1) according to DIN 66 131
2) according to DIN 53 194 (not sieved), ISO 787/XI or JIS K 5101/18
3) according to DIN 53 200 (in 5% aqueous dispersion), ISO 7878/IX, ASTM
4) according to DIN 53 580, ISO 787/XVII or JIS K 5101/20
5) according to DIN 55921, ASTM D 1208 or JIS K 5101/23
6) based on the substance dried at 105° C. for 2 hours
7) based on the substance annealed at 1000° C. for 2 hours

| | | Extrusil |
|---|---|---|
| Surface according to BET 1) | m$^2$/g | 35 |
| Average size of the primary particles 9) | nm | 25 |
| Packing density 2) | g/1 | 300 |
| pH 3) | | 10 |
| Sieve residue 4) according to Mocker, 45 μm | % | 0.2 |
| Loss on drying 5) (2 h, 105° C.) | % | 6 |
| Loss on annealing 5) 6) (2 h, 1000° C.) | % | 7 |
| SiO$_2$ 7) | % | 91 |
| Al$_2$O$_3$ 7) | % | 0.2 |
| CaO 7) | % | 6 |
| Na$_2$ 7) | % | 2 |
| Fe$_2$O$_3$ 7) | % | 0.03 |
| SO$_3$ 7) | % | — |
| Cl$^-$ 7) | % | 0.8 |

1) according to DIN 66 131
2) according to DIN 53 194 (not sieved), ISO 787/XI or JIS K 5101/18
3) according to DIN 53 200 (in 5% aqueous dispersion), ISO 787/IX, ASTM D 1208 or JIS K 5101/24
4) according to DIN 53 580, ISO 787/XVII or JIS K 5101/20
5) according to DIN 55 921, ASTM D 1208 or JIS K 5101/23
6) based on the substance dried at 105° C. for 2 hours
7) based on the substance annealed at 1000° C. for 2 hours
8) not reproducible for measuring
9) the size of the primary particles of silicates cannot be determined accurately owing to excessive agglomeration
10) loss on annealing 1 h 800° C.
11) based on the substance annealed at 800° C. for 1 h Determination of the physico-chemical characteristics is carried out by the following methods:

pH (according to DIN 53 200)

The pH is determined electrometrically with a glass electrode and a pH meter. The pH of silicas is generally in the neutral range, that of silicates in the slightly alkaline range.

Sieve residue (according to DIN 53 580)

The sieve residue is an indication of the degree of subdivision. The sieve residue is determined by the method of Mocker for measuring the very small quantities of undispersible or difficulty dispersible components occurring in precipitation silicas and silicates. In this process, a silica suspension is flushed through the sieve at a water pressure of 4 bar. The sieve is then dried and the sieve residue is weighed. The sieves used are 45 micrometer sieves, corresponding to a 325 mesh (according to ASTM).

Surface according to BET (DIN 66 131)

The surface of silicas and silicates is determined in $m^2/g$ by the BET method. The process is based on the adsorption of gaseous nitrogen at the temperature of liquid nitrogen. The area meter method of Haul and Dümbgen may advantageously be employed. Calibration is necessary. Both the "inner" and the "outer" surface is measured.

Average size of the primary particles

The average size of the primary particles may be determined by electron microscopic photographs. The diameters of about 3000–5000 particles are determined and their arithmetic mean calculated. The individual primary particles are generally not present in isolation but combined to form aggregates and agglomerates. The "agglomerate" particle size of precipitation silicas and silicates depends on the milling process employed.

Packing density (according to DIN 53 194)

This is an indication of the weight of the pulverulent product. About 200 ml of silica are rammed 1250 times in the measuring cylinder of the packing volumeter. The packing density is calculated from the original weight and the volume and given in terms of g/l.

Loss on drying (according to DIN 55 921)

The precipitation products contain a small proportion of physically bound water. After 2 hours, drying in a drying cupboard at 105° C., most of the physically bound quantity of water has been removed.

Loss on annealing (according to DIN 55 921)

After 2 hours, annealing at 1000° C., the water bound chemically in the form of silanol groups has also been removed. The loss of annealing is determined on the substance which has been dried at 105° C. for 2 hours.

Precipitated silica FK 320 DS is a precipitation silica which has been steam jet milled after rotary tube drying.

The precipitated silica Durosil is a rotary tube dried precipitated silica which has not been milled.

Precipitated silica Sipernat 22 is a spray dried precipitated silica.

Precipitated silica Sipernat 22 S is a precipitation silica which has been spray dried and milled.

Precipitated silica Sipernat 22 LS is a precipitated silica which has been spray dried and air jet milled.

Precipitated silica Extrusil is a precipitated silica containing a small proportion of calcium silicate.

The carbon blacks used in the bitumen granulate according to the invention may be carbon blacks prepared by a known process such as the flame soot, gas soot or furnace soot process (see Ullmanns Enzyklopädie der technischen Chemie, 4th Edition, Volume 14, pages 633 to 648).

Specific surface area:

-continued

| according to BET DIN 66 132/ASTM D 3037 | $m^2/g$ | 1000 |
|---|---|---|
| by iodine adsorption DIN 53 582/ASTM D 1510 (initial weight 0.05 q) | (mq/q) | 1000 |
| DBP adsorption DIN 53 601/ASTM D 2414 | (ml/100 q) | 370 |
| pH DIN 53 200/ASTM 1512 | | 8 |
| Packing density DIN 53 194/ISO 787 XI | (g/l) | 140 |
| Loss on drying DIN 53 198/ASTM D 1509 | (%) | max. 1 |
| Ashing residue DIN 53 586/ASTM D 1506 | (%) | max. 1 |
| Sieve residue according to Mocker DIN 53 580/ASTM D 1514 | (%) | max. 0.05 |

The invention further relates to the process for the preparation of the bitumen granulate according to the invention, characterized in that hot, liquid bitumen is atomized in a known spray mixer and at the same time the powdering and separating agent is introduced into the spray mixer a stream of cold air.

In the process according to the invention, the liquid bitumen droplets cool in the stream of cold air. During this step, the bitumen droplets are covered by the powdering and separating agent and thereby prevented from caking and sticking together at the interfaces.

The bitumen is solid in the cold state. It must be melted before its introduction into the spray mixer.

It is particularly economical to process hot, liquid bitumen directly from a refinery and to position the spray mixer in the refinery.

The following parameters are preferred for carrying out the process according to the invention:

| Bitumen temperature | >180° C. |
|---|---|
| Cooling air temperature | <10° C. |
| Viscosity of the bitumen during atomization: | <70 cp. |

The bitumen granulate according to the invention prepared as described above may be mixed with further powdering and separating agent.

The bitumen granulate according to the invention retains the type specific properties of the bitumen used in the process and acts as binder after it has melted.

For various application, the powdering and separating agents may serve as aggregates. The bitumen granulate according to the invention has the following advantages: Its preparation may take place in the refinery. When the sites for storing mineral oil are transferred from the industrial and consumer countries to countries of petroleum recovery, problems may arise in transporting the bitumen obtained as "distillation sump" as a tough, elastoviscous mass.

Pouring bitumen out in blocks requires a melting process at the site of processing before the substance is metered.

A pulverulent substance is easier to handle. Small to medium quantities may be packaged in environmentally suitable paper bags. Large drums and silos may also be used.

Cold free-flowing material is generally easier to measure out than hot liquid masses.

For the preparation of road asphalt, mixing plants may be simplified both in the storage of bitumen and in the mixing technology.

The preparation and processing of bituminous roof materials is facilitated.

The production of protective materials for buildings (e.g. bituminous lacquers and paints) based on solvents or emulsions is facilitated.

The bitumen granulate according to the invention is a pulverulent binder which can be supplied in the cold state and may be heated on the site (e.g. melted) for use. Repairs may thus be carried out on the building site, in roads, on bridges, roofs, etc.

The production of special building materials (e.g. insulating boards) is facilitated by using the granular bitumen in a process of hot molding.

DETAILED DESCRIPTION OF PREFERRED EMBODIMENT

EXAMPLE

Bitumen granulate is prepared by a spray granulating process. The plant consists of the spray granulator of the firm Luco-Sprühmisch-Technik GmbH, a melting station and mixer. An ordinary commercial type of cold bitumen is melted in the melting container. The liquid bitumen is then atomized in the spray granulator. Granulation takes place in the spray tower. The powdering and separating agent used is a silica known as Sipernat 22 S. The cooled bitumen is post-treated in a mixer.

The melting station consists of a container heated by strip heaters although it could quite well be heated by some other means, e.g. jacket heating and thermo oil.

The temperature in the container is regulated by a thermostat. A temperature of about 250° C. can be obtained with the present-day equipment of the plant. Higher temperatures (300° to 350° C.) are required for certain high melting types of bitumen.

The product is discharged from the container by means of a pump. A pulsation damper for equalizing the pulsations produced by the piston pump is installed on the pressure side of the pump. The pulsation damper is a tube mounted on the pressure side of the pump. This tube is closed by a flange at the top. A manometer is attached to this flange. During the time of operation, the pump first pumps the bitumen into the pulsation damper, whereby an air cushion is produced. This air cushion to a large extent compensates for the pulsation produced by the pump and enables an almost constant spray cone to be obtained when the bitumen is atomized.

All pipes connected to the container are heated to 250° C. The pipes connected to the container lead either to the spray granulator or back to the container.

The bitumen enters the Luco spray granulator at a temperature of about 200° C. (the exact temperature is a function of the type of bitumen). The apparatus combines two processes, the fluidized bed process and the atomization technique. The bitumen is atomized in the upper part of the tower. At the same time, the silica Sipernat 22 S is introduced as separating agent into the spray tower.

The bitumen particles which are in the process of cooling become covered with the Sipernat 22 S, which prevents the bitumen from sticking together. The bitumen granulate, which in part is still warm, drops further down into the tower to reach the fluidized bed which effects further cooling of the bitumen granulate. It is only when the bitumen has also lost its inner heat that it leaves the spray granulator. The bitumen may then be packaged into sacks or it may, if necessary, be subjected to an after-treatment.

BRIEF DESCRIPTION OF FIGURES OF DRAWING

Figure 1:
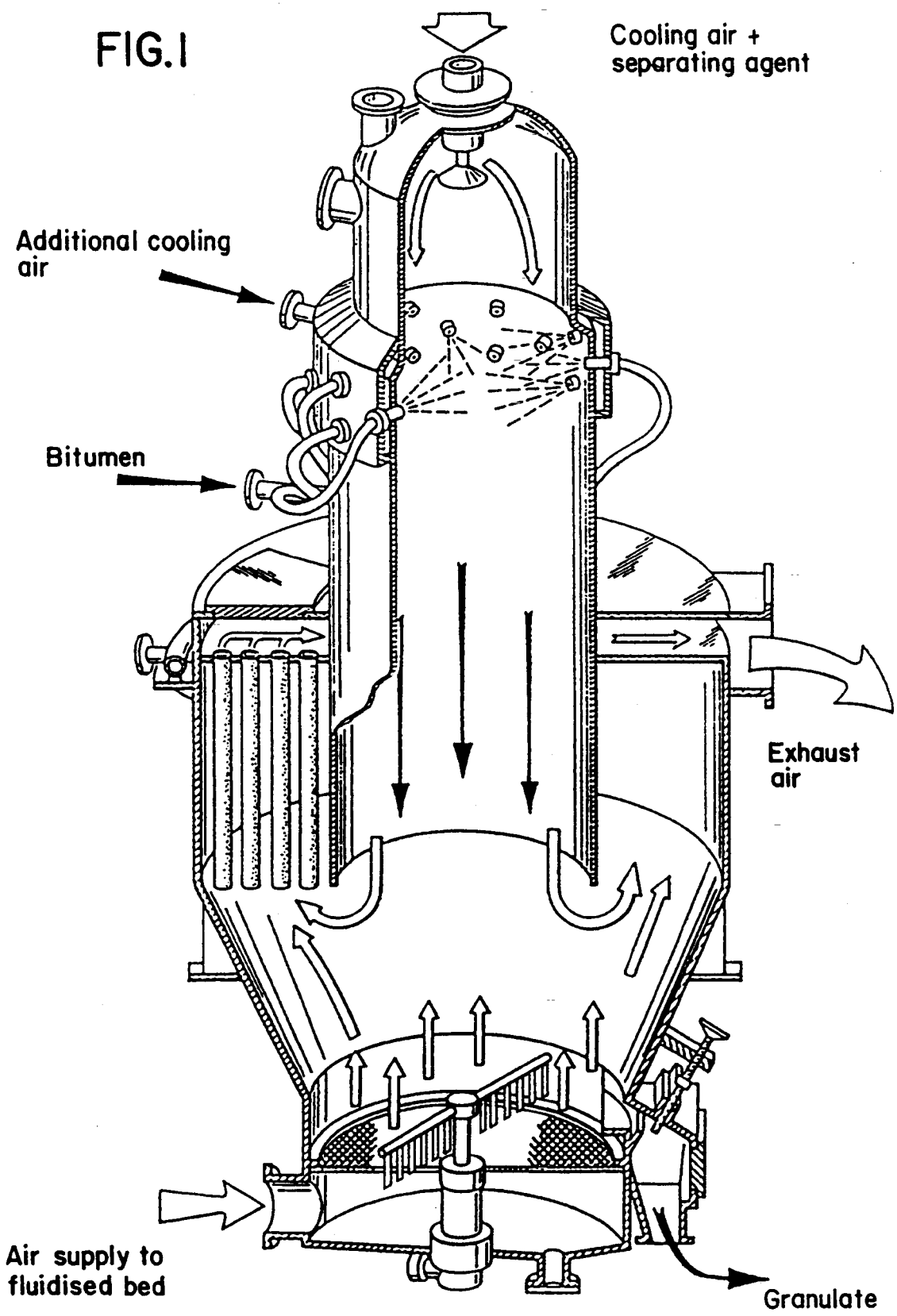
FIG. 1 illustrates a spray granulator in perspective, partly in section.

As shown in FIG. 1, the spray mixing container is situated above the rectangular fluidized bed. This container has a height of 3 meters and a diameter of 2 meters. The height of the spray tower is determined by the amount of drop required for cooling the granulate.

The diameter of the container should be at least 1 meter greater than the greatest diameter of the spray cone. This is to prevent the material being sprayed against the wall. The diameter of the spray cone must be determined empirically by preliminary tests. The required spray cone diameter for bitumen is difficult to calculate.

One material nozzles, two material nozzles and rotary discs are available for atomization processes. Two material nozzles produce a smaller average grain than one material nozzles, i.e. the total surface area of a one material nozzles, i.e. the total surface area of a granulate produced by two material nozzles is considerably greater than that produced by one material nozzles. Substantially less silica Sipernat 22 S is therefore required as separating agent when one material nozzles are used.

One material nozzles having a minimum bore of 1 mm are used. Smaller nozzle diameters have the undesirable effect of producing blockages. The minimum diameter is an experimentally determined value. The spray cone is chosen as large as possible (120°) for achieving optimum material exchange and heat exchange.

The bitumen leaves the nozzle at a pressure of 12 bar. The nozzle has a bore of 1.5 mm. Under these conditions, a capacity of 75 kg/h of bitumen granulate is obtained.

The silica Sipernat 22 S used as separating agent is introduced into the tower from a vibrator chute at a rate corresponding to the required mass stream. The bitumen granulate drops into a vibration fluidized bed in which the blower has a volume stream of 20 $m^3$.min. The second blower delivers 10 $m^3$/min. The air in the tower is sucked off through a filter and a third blower above the fluidized bed. This blower has a volume stream of 60 $m^3$/min. The excess of air is taken in as secondary air at the top of the tower through an opening having a diameter of 400 mm. This secondary air flows through the spray granulator in the same direction as the main product stream. This construction enables the bitumen, which has just been sprayed, to cool rapidly. A counterflow process in which air is drawn off at the top of the tower could also be used but would increase the dwell time of the granulate in the tower.

It has been found in the course of the experiments that the surrounding air sucked in does not provide sufficient cooling to completely cool down the hot bitumen granulate. A cooling installation enabling the air to be cooled down to 10° C. was therefore installed adjacent to the tower.

The cooled bitumen granulate leaves the spray granulator by way of a packing device in which it is packed into sacks. The bitumen may subsequently be subjected to an after-treatment if required. The object of this after-treatment is to adjust the silica Sipernat 22 S used as separating agent to the exactly required quantity and to treat the surface of the granulate to ensure complete covering of the granules with the Sipernat 22 S serving as separating agent. A drum mixer is used for this after-treatment. Any other mixer could also be used, provided it ensures careful handling of the granulate.

Storage tests

The bitumen granulate is a solid form of road building bitumen which has cooled and has been covered with synthetic silica to prevent caking.

Quantities produced on an industrial scale contain a B 80 as starting bitumen which still has the typical, unaltered characteristics after the production process. The pulverulent bitumen concentrate should provide for a simplified and improved preparation of asphalt in which hot storage of liquid bitumen at the asphalt mixing plant may be avoided. The precondition for this result is a storage stability adapted to the conditions of practical conditions.

Figure 2:
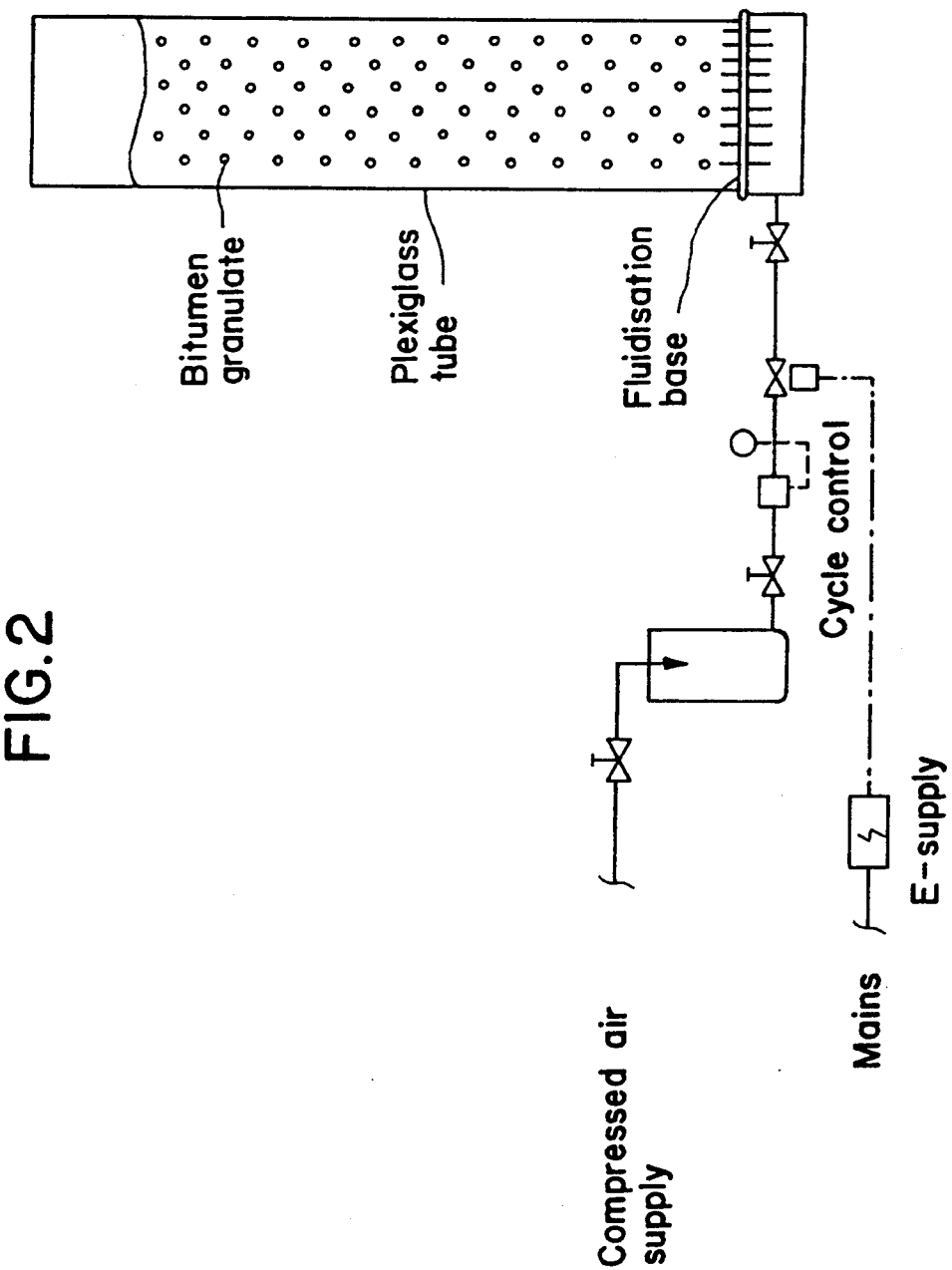
FIG. 2 is a schematic view showing the testing of storage packing.

In the conventional storage of bitumen granulate, e.g. in silos, the product undergoes a reduction in volume and therefore caking. A storage test designed to determine caking of the individual pulverulent bitumen particles was carried out with a specifically provided experimental apparatus. The experimental apparatus is indicated schematically in FIG. 2.

The bitumen granulate used for the experiment was a granulate which contained 10% by weight of Sipernat 22 S with an average agglomerate size of 7 μm (Coulter Counter) and had been stored in drums for 7 months, partly at summer temperatures (up to 35° C.). About 90 kg of bitumen granulate were introduced into a synthetic glass cylinder shown in FIG. 2.

The height of the column of material was about 2,000 mm. The product was periodically ventilated through a fluidization base. The increase in volume was then only 10 to 15%.

Experiment 1

Test product: Bitumen granulate containing 10% of Sipernat 22 S

Product temperature: 27° C. on introduction into the cylinder
External temperature: 17°-35° C.
Ventilation time: 30 sec
Resting time: 30 min to 120 min
Pressurized air: 2 bar
Experimental time: 16 days
After the first 7 days, the resting time was increased to 120 min.

Experiment 2

The procedure was the same as Experiment No. 1 except that the resting time was first increased to 8 hours and the product was then left to rest for 10 days and thereafter again ventilated.

The bitumen granulate was stable in storage when the conditions indicated above were observed. Ventilation through a fluidized base is essential. This should take place periodically. If one considers that the starting product used for the storage tests had been kept in drums for 7 months, the result must be regarded as satisfactory. The B 80 was a deliberate choice of a soft road building bitumen for the preparation of the granulate. Harder bitumen would presumably give rise to powder concentrates with even greater storage stability. Cold bitumen granulate may thus be stored in the silo with periodic fluidization. The ventilation time of 30 seconds is sufficient. The resting times depend to a large extent on the proportion of Sipernat, the filling height in the silo and the temperature. Resting intervals of 30 minutes to 3 hours may be included in the program. The results show that bitumen granulate may be transported in sacks or as loose free-flowing material. If it is to be transported as a loose product, a suitable transport apparatus (with integrated fluidization base) should be used, depending on the distance and duration of transport.

Summarizing, it is found that bitumen granulate can be produced, transported and stored, provided the conditions found are observed.

What is claimed is:

1. Free flowing bitumen granulate comprising bitumen granules having a particle size from 500 to 700 μm said granulate containing 6.1 to 15% by weight of a substance which serves as a powdering and separating agent and forms a covering on the bitumen, said substance being precipitated silica.

* * * * *